United States Patent
Masrur et al.

Patent Number: 5,469,351
Date of Patent: Nov. 21, 1995

[54] FAULT ISOLATION IN AN INDUCTION MOTOR CONTROL SYSTEM

[75] Inventors: Md A. Masrur, West Bloomfield; Xingyi Xu; Feng Liang, both of Canton, all of Mich.

[73] Assignee: Ford Motor Company, Dearborn, Mich.

[21] Appl. No.: 270,967

[22] Filed: Jul. 5, 1994

[51] Int. Cl.⁶ .......................... H02M 5/458; H02H 7/12
[52] U.S. Cl. ...................... 363/56; 363/37; 363/98
[58] Field of Search .................. 361/100, 23, 31, 361/57; 363/50–51, 37, 54–58, 98; 318/434, 803, 760–762, 414–416, 500–501, 507, 144, 158, 302, 341–342; 307/252 M

[56] References Cited

U.S. PATENT DOCUMENTS

| | | | |
|---|---|---|---|
| 3,555,356 | 1/1971 | Kaiser | 317/13 |
| 4,075,674 | 2/1978 | Squiers et al. | 361/27 |
| 4,308,491 | 12/1981 | Joyner, Jr. et al. | 318/732 |
| 4,309,735 | 1/1982 | Morris | 361/100 |
| 4,475,150 | 10/1984 | D'Atre et al. | 363/51 |
| 4,575,668 | 3/1986 | Baker | 318/811 |
| 5,214,575 | 5/1993 | Sugishima et al. | 363/37 |
| 5,341,075 | 8/1994 | Cocconi | 318/139 |

OTHER PUBLICATIONS

"A Strategy To Isolate The Switching Sevice Fault Of A Current Regulated Drive Motor" by Fu and Lipo, 1993 IEEE Industry Applications Society, Toronto, Ontario, Canada, Oct. 2–8, 1993, pp. 1015–1020.

"A Strategy For Improving Relieability Of Field Oriented controlled Induction Motor Drives" by Liu et al, 1991 IEEE Industry Applications Society, Sep. 28–Oct. 4, 1991, pp. 449–455.

"Improving Reliability Of Induction Motor Drives By Means Of Fast Acting Current Regulation" by Lipo and Fu, 1st European Conference On Reliability Standardization & Certification of Industrial Electric Drives, May 25–27, 1992, Milan, Italy, pp. 1–16.

*Primary Examiner*—Peter S. Wong
*Assistant Examiner*—Aditya Krishnan
*Attorney, Agent, or Firm*—Mark S. Sparschu; Roger L. May

[57] ABSTRACT

A fault isolation system for a three-phase induction motor drive system includes an inverter to convert direct-current power from a battery into alternating current for the three phases of the motor. The inverter contains six semiconductor switches, two for each phase of the motor, as is conventional in the art of induction motor control. Further, the inverter contains two additional semiconductor switches. These switches form an output connected, via a dummy load in parallel with a third additional semiconductor switch, to the neutral connection of the motor. In the event that any of the six conventional switches in the inverter become short-circuited, the four switches in the other two phases of the inverter as well as the two additional switches are actuated to generate current sufficient to blow a fuse connected in series with the output of the inverter coupled to the short-circuited switch. The motor is thus isolated from the short-circuited switch, preventing the short-circuited switch from totally disabling the motor. An alternative motor drive strategy, such as a two-phase drive strategy, can then be employed.

14 Claims, 5 Drawing Sheets

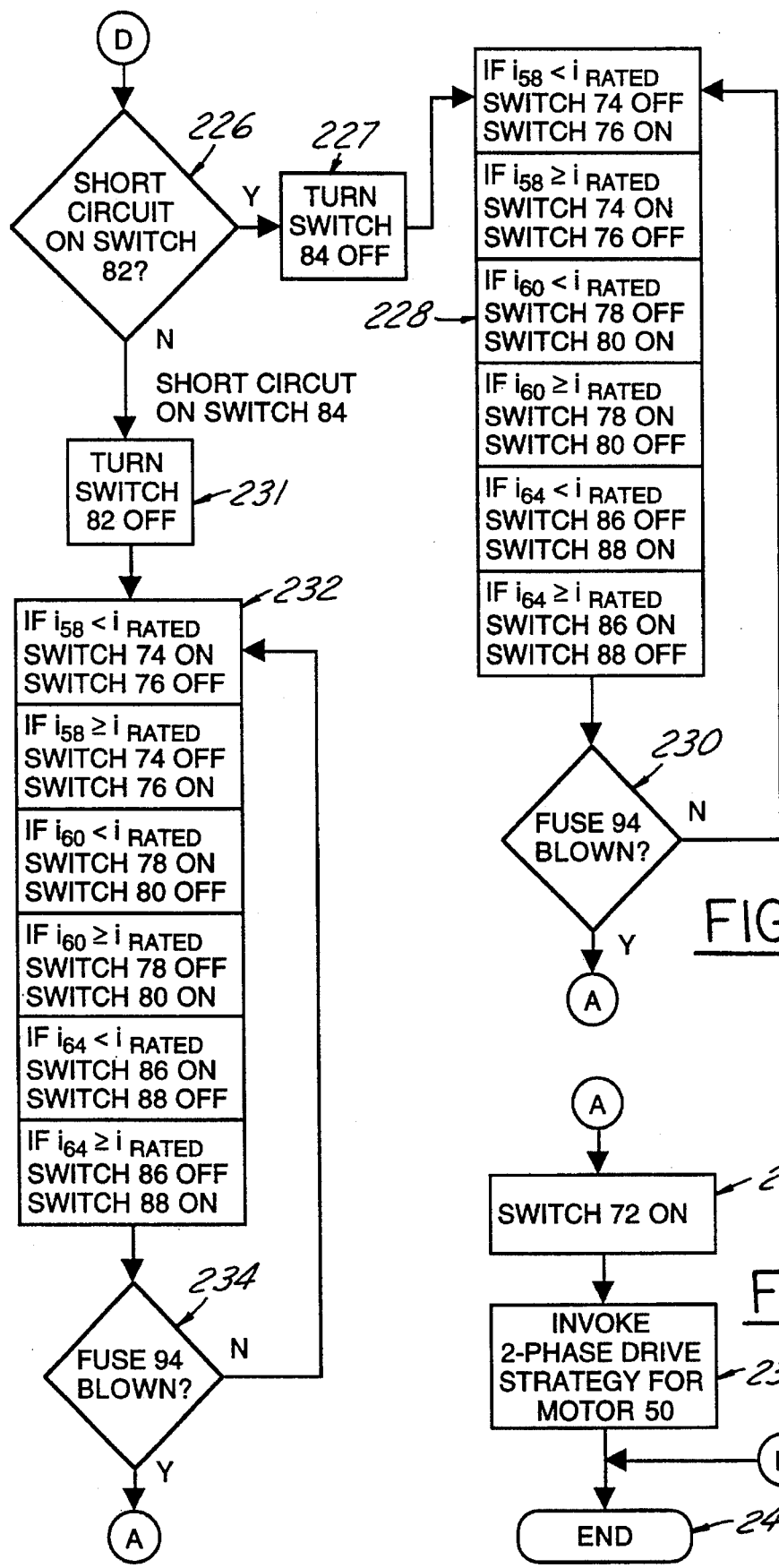

5,469,351

FAULT ISOLATION IN AN INDUCTION MOTOR CONTROL SYSTEM

BACKGROUND OF THE INVENTION

1. Field of the Invention

The present invention relates to induction motor control generally and more specifically to fault isolation in an induction motor control system.

2. Description of the Related Art

Electrically-driven automobiles are often powered by a three-phase induction motor. That motor in turn often receives its power from a three-phase inverter connected to a battery. The inverter converts direct-current electric power from the battery into three-phase alternating-current electric power for use by the motor.

Inverters typically have a section dedicated to each phase of the motor. Each section has two switches, typically semiconductor switches. One side of the first switch is connected to positive voltage from the battery. One side of the second switch is connected to battery ground. The second sides of each switch are connected together. The node formed by this connection of the second side of each switch is the output of the particular section of the inverter in question. This output is connected to one phase of the motor.

All told, there are six semiconductor switches in an inverter, two for each of the three phases. Alternating current is produced for the motor through appropriate actuation of the switches, as is well-known in the art of induction motor control.

A difficulty occurs when one of the six switches in an inverter fails in a short-circuited condition. "Short-circuited" refers to the switch being continually closed. When any one of the six switches is short-circuited, the inverter can no longer control the induction motor. As long as the short-circuited switch remains connected to the motor, therefore, there is no other choice than to turn off the motor. The vehicle is then inoperative.

To allow the vehicle to operate, though in a degraded mode, a three-phase induction motor can be operated on only two phases. However, in order to operate the motor on two phases, the short-circuited switch must first be isolated from the motor.

One way to isolate a short-circuited inverter switch is disclosed in Fu and Lipo, "A Strategy to Isolate the Switching Device Fault of a Current Regulated Drive Motor" in Conference Record of the 1993 IEEE Industry Applications Society 28th Annual Meeting (1993). The system described in that paper is illustrated as FIG. 1. A pair of capacitors 22 and 24 are connected in series across battery 20, which is connected to inverter 21. Further, each circuit from inverter 21 to motor 35 has a fuse 32, 33 or 34 installed. Also, each circuit from inverter 21 to motor 35 is connected to the center node of capacitors 22 and 24 via a triac 36, 37 or 38. When a short circuit is detected on any one of the six switches 26, 27, 28, 29, 30 or 31 of inverter 21, the triac 36, 37 or 38 corresponding to that short-circuited switch is closed. The stored energy in capacitors 22 and/or 24 then blows the fuse connected to the triac. Thus, the short-circuited inverter switch is isolated from motor 35.

Although that system may be effective in isolating a short-circuited inverter switch, the use of capacitors in the traction system of an electric vehicle can be disadvantageous. To handle the high voltages of an electric vehicle, the capacitors would need to be quite large, adding expense to the vehicle. Further, a system which uses fewer overall components could potentially by more reliable and less costly.

Therefore, a system which can isolate a short-circuited inverter switch without the use of large capacitors and with fewer overall components can provide an advantage over the prior art.

SUMMARY OF THE INVENTION

The present invention provides a fault isolation system. The fault isolation system includes an inverter, the inverter further including at least two phase portions, each phase portion having an output, and a neutral portion, the neutral portion having an output. The fault isolation system further includes at least two overcurrent protection means, one of the overcurrent protection means coupled in series with each output of each phase portion of the inverter. Also, the fault isolation system includes an electrical load, the electrical load having as many phases as the number of at least two phase portions of the inverter, the electrical load also having a neutral connection. Each phase of the electrical load is coupled in series with one output of a phase portion of the inverter, and the neutral connection is coupled in series with the output of the neutral portion of the inverter.

The present invention further provides a fault isolation method for isolating a short-circuited switch of an inverter, the inverter having a plurality of phase portions, the short-circuited switch contained within one of the phase portions, each phase portion having an output coupled to one phase of an electrical load, the inverter further having a neutral portion, the neutral portion having an output coupled to a neutral connection of the electrical load. The method comprises the step of inducing currents in phases of the electrical load coupled to outputs of inverter phase portions not containing the shorted switch. The method further includes the step of inducing a current at the neutral connection of the electrical load. Additionally, the method includes the step of continuing to induce the currents in phases of the electrical load and at the neutral connection of the electrical load until the opening of overcurrent protection means coupled in series with the output of the phase portion containing the short-circuited switch.

The present invention provides an advantage over the prior art by eliminating the need for large capacitors in a fault isolation system for a short-circuited inverter switch. Further, the present invention provides the potential for a reduction in the number of components over prior art systems.

BRIEF DESCRIPTION OF THE DRAWINGS

FIG. 3C illustrates a third portion of the fault isolation algorithm performed by motor controller 55.

3

Figure 3A:
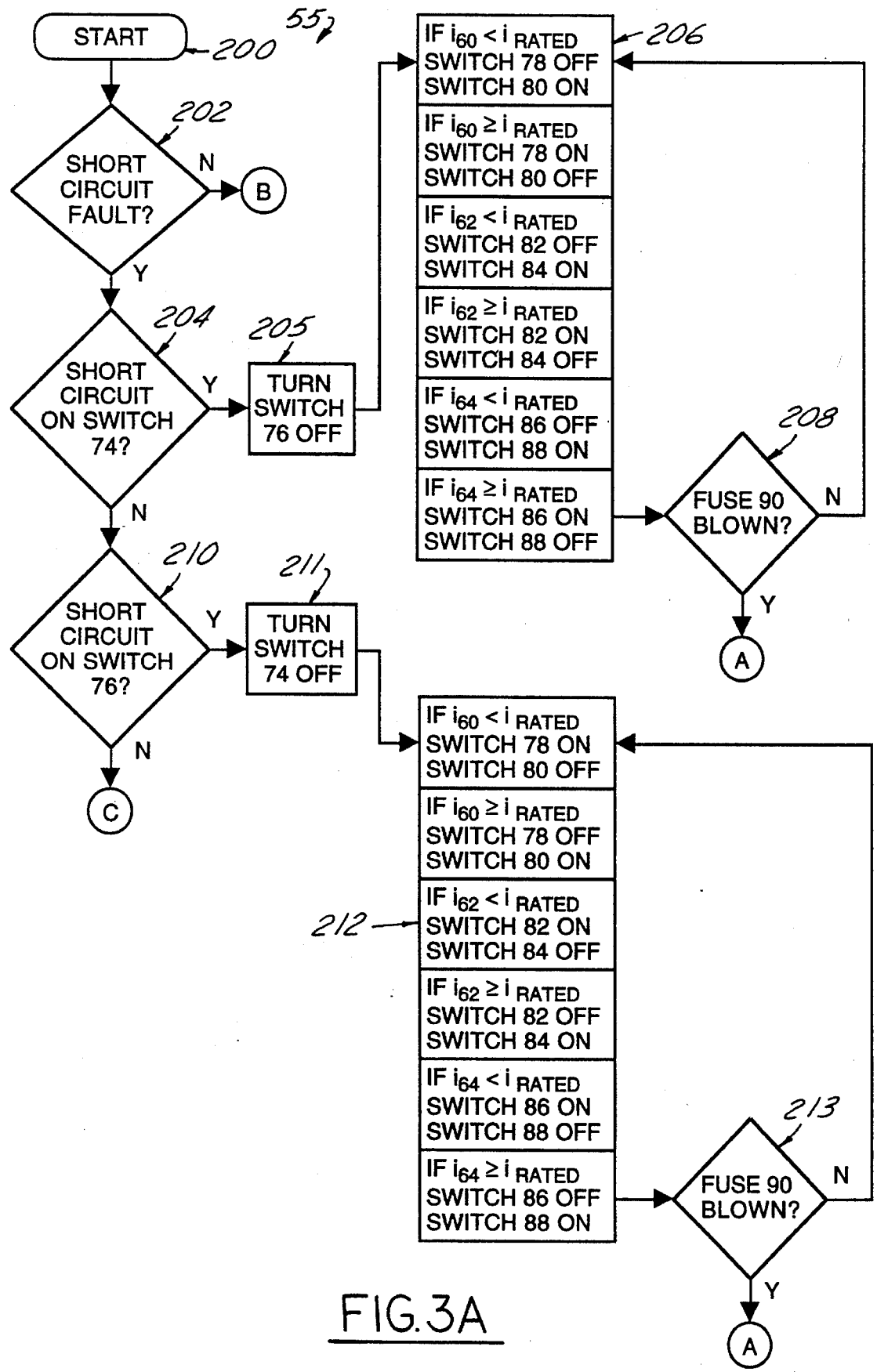
FIG. 3A illustrates a portion of a fault isolation algorithm performed by motor controller 55 of FIG. 2, according to one embodiment of the present invention.
Figure 3B:
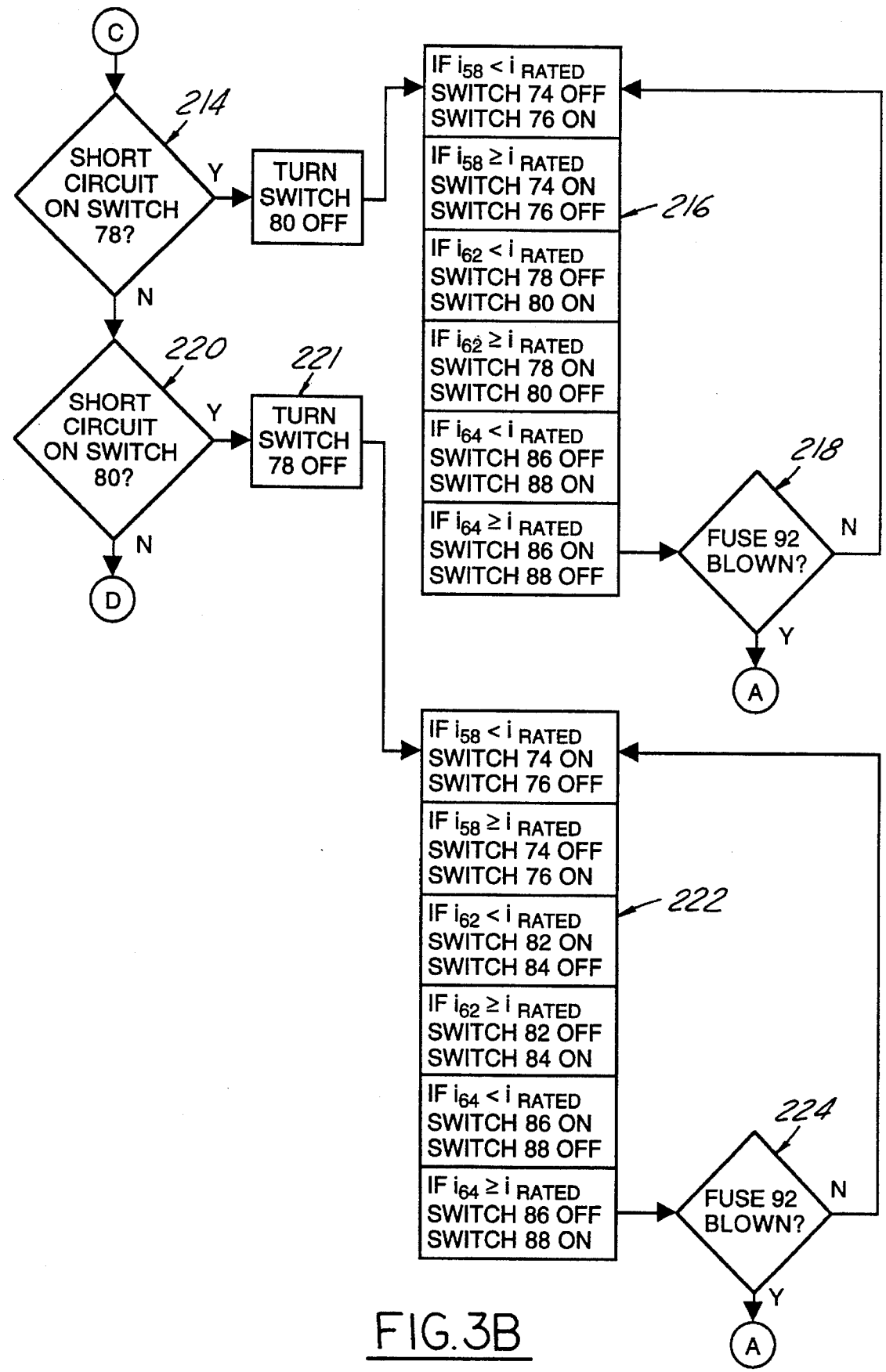
FIG. 3B illustrates a second portion of the fault isolation algorithm performed by motor controller 55.

FIG. 3D illustrates a fourth portion of the fault isolation algorithm performed by motor controller 55.

Figure 1:
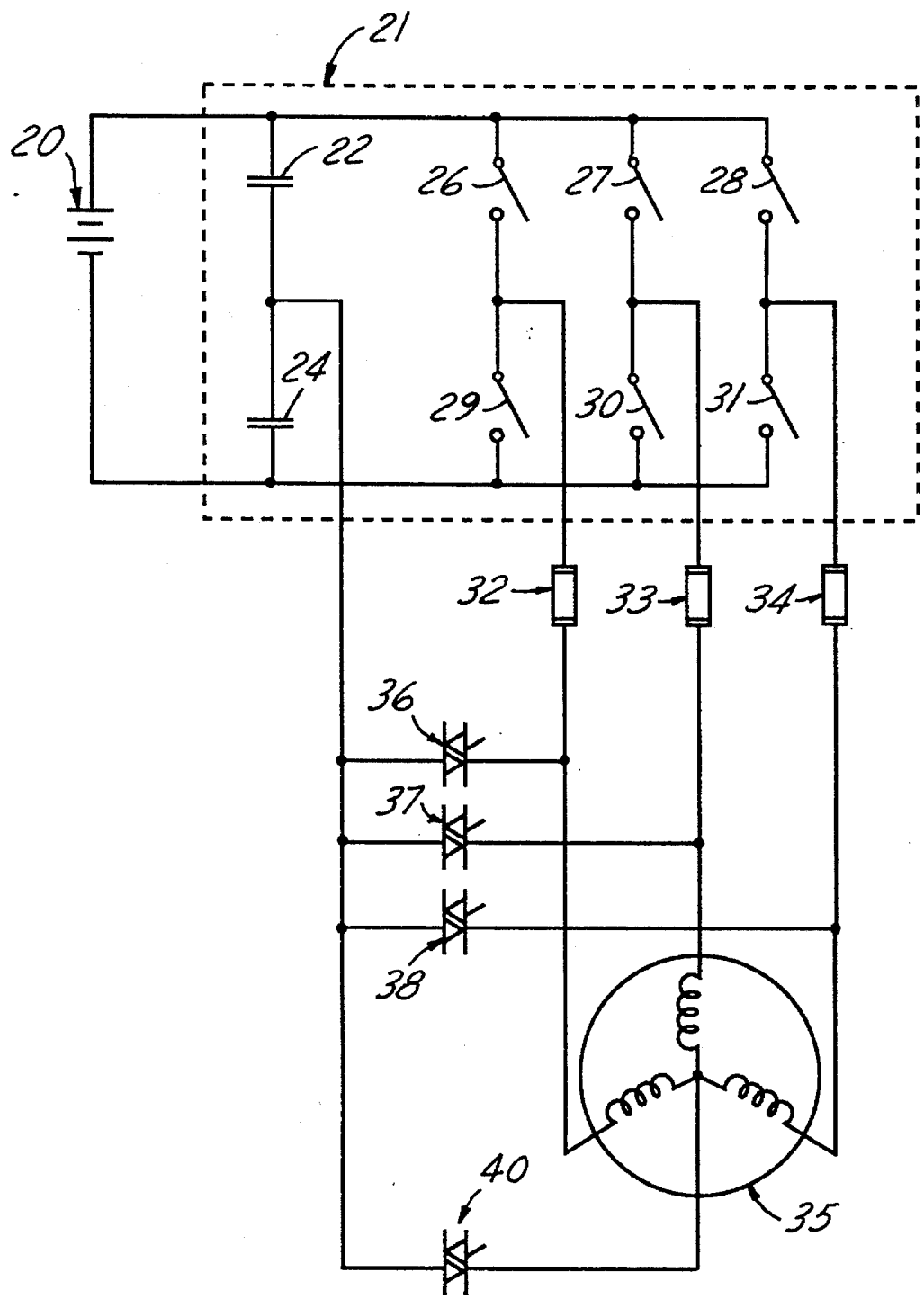
FIG. 1 illustrates a prior art system for isolating a short-circuited inverter switch from a motor.
Figure 2:
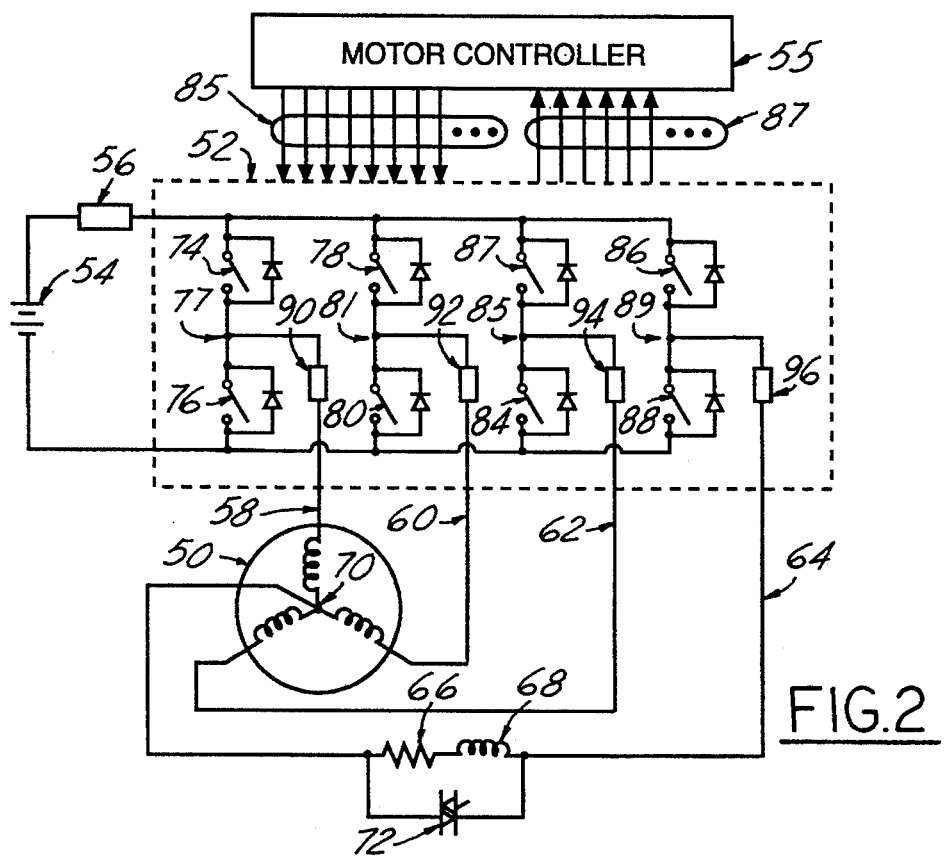
FIG. 2 illustrates a system for isolating a short-circuited inverter switch according to one embodiment of the present invention.
Figure 4:
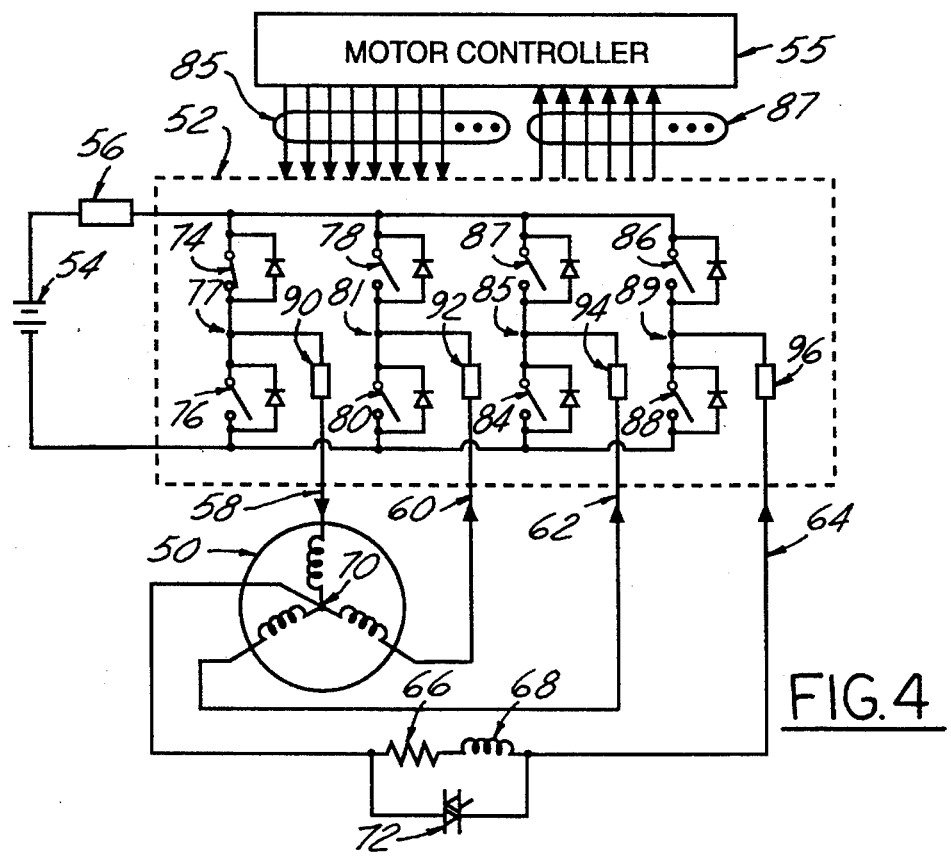

FIG. 4 illustrates the operation of the system of FIG. 2 in isolating a short-circuit fault on switch 74 of FIG. 2.

DETAILED DESCRIPTION OF THE PREFERRED EMBODIMENT

FIG. 2 illustrates one embodiment of a system for isolating a short-circuited inverter switch according to the present invention. A three-phase induction motor 50 is connected to an inverter 52. Positive and negative terminals of battery 54 are connected to positive and negative inputs of inverter 52, respectively. Battery 54 provides power for motor 50. Fuse 56, commonly used in the art, protects against excessive current draw from battery 54.

Inverter 52 is connected to motor controller 55. Motor controller 55 is responsible for controlling inverter 52 such that three phase power is supplied via inverter 52 from battery 54 to motor 50. Motor controller 55 is preferably a microprocessor-based device with sufficient registers, memory, throughput, and other resources to perform the functions ascribed to it herein.

Inverter 52 and motor 50 are connected via four circuits 58, 60, 62 and 64. Circuits 58, 60 and 62 each provide one phase of the three-phase power to motor 50. Circuit 64 is connected to a dummy load comprising resistor 66 and inductor 68. The dummy load is preferably of approximately the same impedance as the per-phase impedance of motor 50. The dummy load is connected to neutral 70 of motor 50. A switch, preferably a triac 72, is connected across resistor 66 and inductor 68.

Within inverter 52 are switches 74, 76, 78, 80, 82 and 84. For simplicity of presentation, switches 74, 76, 78, 80, 82 and 84 are shown schematically in FIG. 2 as generic switches. Switches 74, 76, 78, 80, 82 and 84 are preferably solid state switches such as insulated-gate bipolar transistors (IGBTs), MOSFETS, or bipolar junction transistors (BJTs). Among signals 85 provided by motor controller 55 to inverter 52 are control signals to control switches 74, 76, 78, 80, 82 and 84. The electrical characteristics of the control signals which control those switches are well-known in the art of induction motor control.

Switches 74 and 76 provide power to one phase of motor 50. Motor controller 55 opens and closes switches 74 and 76 to transform direct-current power from battery 54 into alternating current at output 77 of switches 74 and 76. That alternating current is provided by circuit 58 to motor 50. Similarly, switches 78 and 80 produce alternating current at output 81 and circuit 60, while switches 82 and 84 produce alternating current at output 85 and circuit 62. The control of switches 74, 76, 78, 80, 82 and 84 to convert direct-current power to alternating-current power for the three phases of motor 50 is conventional and is well-known in the art of induction motor control.

Switches 74, 76, 78, 80, 82 and 84 exist in conventional inverters known to the art of induction motor control. Added to that conventional configuration are switches 86 and 88. Although shown as generic switches for simplicity of presentation, switches 86 and 88 are preferably solid state switches such as insulated-gate bipolar transistors (IGBTs), MOSFETS, or bipolar junction transistors (BJTs). Among signals 85 provided by motor controller 55 to inverter 52 are control signals to control switches 86 and 88.

Fuses 90, 92 and 94 should be chosen to have a current rating slightly greater than the per-phase rated current of motor 50. Otherwise, fuses 90, 92 and 94 may blow during normal operation of motor 50. As will be discussed herein, the purpose of fuses 90, 92 and 94 is to blow as appropriate to isolate switch 74, 76, 78, 80, 82 or 84 from motor 50 if one of those switches becomes short-circuited.

It is important to note that in normal operation of the system of FIG. 2, switches 86 and 88 remain open. As a result, during normal operation of the system, circuit 64 is simply an open circuit with no current flow. Only when one of the switches 74, 76, 78, 80, 82 and 84 experiences a short circuit fault will switches 86 and 88 be operated.

Motor controller 55 has responsibility for detecting and isolating any short circuit fault which occurs on switches 74, 76, 78, 80, 82 and 84. The algorithm performed by motor controller 55 in isolating a short circuit fault is illustrated in FIGS. 3A, 3B, 3C and 3D.

Reference will now be made to FIGS. 2, 3A, 3B, 3C and 3D. At step 202, motor controller 55 determines whether a short circuit exists at any of switches 74, 76, 78, 80, 82 and 84. In normal motor control, motor controller 55 knows the voltages and currents on circuits 58, 60 and 62 (those voltages and currents are among signals 87 illustrated in FIG. 2). Knowing voltages and currents on circuits 58, 60 and 62, motor controller 55 can detect when one of switches 74, 76, 78, 80, 82 or 84 is short-circuited. If none of switches 74, 76, 78, 80, 82 and 84 is short-circuited, the algorithm exits at step 240.

If a short circuit fault does exist, the algorithm proceeds to step 204. If the short circuit is at switch 74, the algorithm proceeds to step 205. (The condition of switch 74 being short-circuited is illustrated in FIG. 4). At step 205, switch 76 is turned OFF to prevent a short circuit across battery 54 through switches 74 and 76. The algorithm them proceeds to step 206.

Reference will now be made to FIGS. 3 and 4. At step 206, switches 78, 80, 82, 84, 86 and 88 are controlled by motor controller 55 so as to preferably cause rated per-phase current of motor 50 to flow in circuits 60, 62 and 64. Further, the result of step 206 is that current flow in circuits 60, 62 and 64 is upward in FIG. 4, as illustrated by the arrows on circuits 60, 62 and 64 in FIG. 4. The result of the currents flowing in circuits 60, 62 and 64 is that a current flows downward in circuit 58, as illustrated by the arrow on circuit 58. Kirchoff's Current Law requires that this current be three times the rated per-phase current of motor 50 (i.e., the sum of the currents in circuits 60, 62 and 64).

The large current in circuit 58 will blow fuse 90 if fuse 90 has a current rating of less than three times the per-phase current of motor 50. As a result, if isolating short-circuited switch 74 is performed by generating rated per-phase current of motor 50 on circuits 60, 62 and 64, the current rating of fuse 90 should be less than three times the rated per-phase motor current. (Similarly, it will become apparent that fuses 92 and 94 are preferably rated at less than three times the rated per-phase current of motor 50.) Step 208 causes the currents on circuits 60, 62 and 64 to be controlled as in step 206 until fuse 90 does in fact blow. At this point, short-circuited switch 74 is isolated from motor 50. The algorithm then proceeds to step 236.

At step 236, triac 72 is turned ON. This bypasses the dummy load which had been formed by resistor 66 and inductor 68. One skilled in the art will recognize that circuit 64 has thus become a neutral circuit for motor 50. Then, at step 238, a two-phase drive strategy is invoked for motor 50. Such a two-phase strategy is known to those skilled in the art of induction motor control. The algorithm is then exited at step 240.

Reference will once again be made to FIGS. 2 and 3. If the answer at step 204 is NO (i.e., switch 74 is not short-circuited), the algorithm proceeds to step 210. At step 210, if the short-circuited switch is switch the algorithm proceeds to step 211. At step 211, switch 74 is turned OFF, to prevent a short circuit across battery 54 through switches 74 and 76. The algorithm then proceeds to step 212.

At step 212, switches 78, 80, 82, 84, 86 and 88 are controlled in order to preferably cause rated per-phase current of motor 50 to flow in circuits 60, 62 and 64. The control performed at step 212 is similar to that at step 206, except for one difference. The direction of current flow in circuits 60, 62 and 64 will be opposite from that during step 206 (which had been illustrated at FIG. 4). However, the currents in circuits 60, 62 and 64 will still cause three times the per-phase rated current of motor 50 to flow in circuit 58 (though in a direction opposite to that shown in FIG. 4). The current in circuit 58 will blow fuse 90. Step 213 assures that currents are controlled per step 212 until fuse 90 blows.

After fuse 90 blows, thereby isolating short-circuited switch 76, the algorithm proceeds to steps 236 and 238. Those steps have been previously described. The algorithm then exits at step 240.

The remainder of the algorithm illustrated in FIGS. 3A, 3B, 3C and 3D is similar to the portions already described. Steps 216 and 222 isolate a short circuit on switches 78 and 80, respectively. Further, steps 228 and 232 isolate a short circuit on switches 82 and 84, respectively.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A fault isolation system comprising:
    (a) an inverter comprising:
        at least a first and a second phase portion, said first phase portion having a first output and said second phase portion having a second output;
        a neutral portion having a third output;
    (b) at least a first and a second overcurrent protection means, said first overcurrent protection means coupled in series with said first output and said second overcurrent protection means coupled in series with said second output; and
    (c) an electrical load, said electrical load having at least a first phase and a second phase, the number of said phases being equal to the number of said phase portions of said inverter, said first phase of said electrical load coupled to said first output, said second phase of said electrical load coupled to said second output, said electrical load further having a neutral connection, said neutral connection coupled to said third output; wherein
    said inverter further comprises a positive direct-current input and a negative direct-current input;
    each said phase portion and said neutral portion of said inverter comprises a first switching means and a second switching means, both said switching means with a first side and a second side, said first side of said first switching means coupled to said positive direct-current input and said first side of said second switching means coupled to said negative direct-current input; and
    said second sides of said first switching means and second switching means are coupled together to form said output of said portion of said inverter.

2. A fault isolation system as recited in claim 1, further comprising a dummy electrical load connected between said third output of said inverter and said neutral connection of said electrical load.

3. A fault isolation system as recited in claim 2, further comprising switching means coupled across said dummy electrical load for bypassing said dummy load.

4. A fault isolation system as recited in claim 3, wherein said dummy electrical load has an impedance such that said inverter can induce a current approximately equal to a per-phase rated current of said electrical load in said dummy electrical load.

5. A fault isolation system as recited in claim 4, wherein said at least first and second overcurrent protection means comprise fuses.

6. A fault isolation system as recited in claim 5, wherein the number of said phase portions of said inverter and the number of said phases of said electrical load is three.

7. A fault isolation system as recited in claim 6, wherein said electrical load is a motor.

8. A fault isolation method for isolating a short-circuited switch of an inverter, said inverter having a plurality of phase portions, said short-circuited switch contained within one of said phase portions, each said phase portion having an output coupled to one phase of an electrical load, said inverter further having a neutral portion, said neutral portion having an output coupled to a neutral connection of the electrical load, said method comprising the steps of:
    (a) inducing currents in phases of said electrical load coupled to outputs of inverter phase portions not containing said short-circuited switch;
    (b) inducing a current at said neutral connection of said electrical load;
    (c) continuing to induce said currents in phases of said electrical load and at said neutral connection of said electrical load until the opening of overcurrent protection means coupled in series with the output of the phase portion containing the short-circuited switch.

9. A fault isolation method as recited in claim 8 wherein:
    said step of inducing currents in phases of said electrical load comprises the steps of opening a still-operable switch in the inverter phase portion containing said short-circuited switch and controlling inverter switches in inverter phase portions not containing a short-circuited switch; and
    said step of inducing a current at said neutral connection of said electrical load comprises controlling inverter switches in said neutral portion of said inverter.

10. A fault isolation method as recited in claim 9 wherein said overcurrent protection means comprises a fuse.

11. A fault isolation method as recited in claim 9 further comprising the step of:
    after said overcurrent protection means opens, bypassing a dummy electrical load coupled between said neutral portion of said inverter and said neutral connection of said electrical load.

12. A fault isolation method as recited in claim 11 wherein said currents induced in said phases of said electrical load coupled to outputs of inverter phase portions not containing a short-circuited switch and at said neutral connection are less than or approximately equal to a maximum per-phase operating current of said electrical load.

13. A fault isolation method as recited in claim 12 wherein said overcurrent protection means comprises a fuse.

14. A fault isolation system comprising:

(a) a three-phase motor;

(b) an inverter comprising:

a positive battery input;

a negative battery input;

three phase portions, each said phase portion comprising first switching means and second switching means, a first side of said first switching means coupled to said positive battery input, a first side of said second switching means coupled to said negative battery input, a second side of said first switching means and a second side of said second switching means coupled together to form an output of said phase portion;

a neutral portion, said neutral portion comprising first switching means and second switching means, a first side of said first switching means coupled to said positive battery input, a first side of said second switching means coupled to said negative battery input, a second side of said first switching means and a second side of said second switching means coupled together to form an output of said neutral portion;

(c) three fuses, each fuse coupled at one side to an output of a said phase portion of said inverter and at a second side to a phase of said motor;

(d) a dummy load approximating a per-phase impedance of said motor, said dummy load connected at one side to said neutral output of said inverter and at a second side to a neutral connection of said motor; and (e) switching means connected across said dummy load for bypassing said dummy load.

* * * * *